Figure 1:
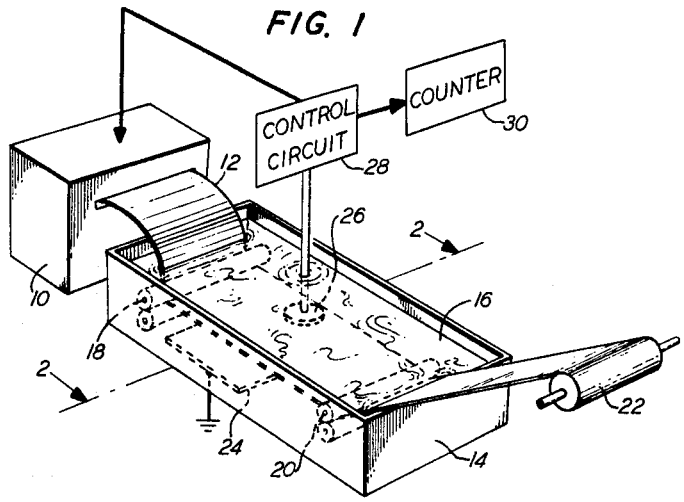

INVENTOR
M.C. BISKEBORN
BY
Edwin B. Cave
ATTORNEY

United States Patent Office 3,388,423
Patented June 18, 1968

3,388,423
METHODS AND APPARATUS FOR MEASURING CHARACTERISTICS OF AN INSULATING SHEET IN AN ELECTROCONDUCTIVE FLUID
Merle C. Biskeborn, Chatham, N.J., assignor to Bell Telephone Laboratories, Incorporated, New York, N.Y., a corporation of New York
Filed Aug. 28, 1964, Ser. No. 392,853
15 Claims. (Cl. 18—2)

This invention relates to methods and means for measuring the characteristics of an insulating sheet and particularly to methods and means for monitoring the characteristics of a moving sheet as it issues from the machine that manufactured it, so as to assure a uniform product.

One of the more useful measurements affecting certain characteristics of a sheet, such as its thickness, may be obtained by sandwiching a predetermined area of the insulating sheet between two opposing metal electrodes and measuring the capacitance between them. The measured capacitance per unit area $C_a = Ke/t$, where K is a constant, $e$ is the dielectric constant of the material, and $t$ the average thickness of the material, can be termed the "unit capacitance" of the material. The ratio $e/t$ can be termed the "capacitance factor."

Because the dielectric constant $e$ is comparatively uniform, the measured unit capacitance $C_a$ may be considered an acceptable measure of the thickness of the sheet. Certainly, if a moving sheet is monitored continuously and the measured capacitance remains within small limits of tolerance, the measuring constancy is acceptable as a measure of the uniformity of the characteristics. Thus, this capacitance measurement constitutes a desirable means for monitoring sheet insulation.

While this capacitance measurement is simple with stationary sheets, it is frequently unsuitable for continuously manufactured moving sheets because the electrodes contacting the material would either have to travel with the sheet during movement, or means are necessary to allow the sheet to slide through the electrodes without forming objectionable voids, while maintaining intimate contact with the undulating surface of the sheet. These measurements must also be made without deforming the cross section of the sheet, particularly if it has just issued from the manufacturing device in a hot state, and pressure would cause plastic deformation.

Some problems of continuously measuring the characteristics of insulating members have been solved with respect to continuously produced insulating wires. My Patent No. 2,804,592, assigned to the assignee of this invention, discloses measuring of the dielectric properties of the tubular insulation surrounding a wire conductor by immersing the insulated wire in an electroconductive liquid, then electrically but not physically isolating an axial column of the liquid surrounding the insulation from longitudinally adjacent axial columns also surrounding the insulation, and measuring the coaxial capacitance established between the column and the interior insulated and grounded conductor.

This approach was able to take advantage of the contact already existing between the conductor that constituted one electrode and the dielectric insulation. More important, it could rely on the electroconductive liquid contacting only one surface of the dielectric insulation. Immersing a flat insulating sheet in an electroconductive bath would start with neither of these important advantages. Thus, the approach in the above-mentioned patent would not be completely applicable to flat sheets.

It is an object of the present invention to improve methods and means for measuring characteristics of flat insulating sheets.

A more specific object of the invention is to improve methods and means for measuring or monitoring the characteristics of moving insulating sheets, particularly the above-defined unit capacitance of the sheets.

Still another object of this invention is to measure accurately the characteristics of sheets as they issue from the machine manufacturing them so that rapid corrective action can be taken in response to departures from predetermined characteristics, and particularly to make such measurements without deforming the material.

Another object of this invention is to measure these characteristics while the material is immersed in an electroconductive liquid despite contact of the liquid with both sides of the dielectric and despite absence of direct contact by one side of the dielectric with an electrode, as existed in Patent No. 2,804,592.

To these ends, and according to a principle of the invention, characteristics of an insulating sheet are measured by submerging both faces of at least a portion of the sheet in an electroconductive liquid such as water, electrically but not physically isolated two bodies of the liquid contacting opposite faces of the submerged sheet, and measuring the capacitive components of the impedance between the liquid bodies. This is accomplished by establishing potential gradients which transform the bodies of liquid into electrically isolated electrodes intimately contacting the sheet, and between which a specific portion of the sheet constitutes a dielectric which may slide easily between the liquid electrodes.

More particularly, the two communicating dielectrically isolated bodies are formed by electrically, but not physically, isolating a single column of conductive liquid extending transverse to the sheet and having cross-sectional dimensions smaller than the sheet, and passing the insulating sheet through the isolated column so as to bisect the column completely, and then measuring the capacitance between the two bodies of the isolated electroconductive liquid that are formed.

More specifically according to the invention, a sheet of insulating material continuously passing from an extruder or rolling mill through a water cooling trough moves between two submerged measuring electrodes across which a source imparts an alternating potential. Isolating two small bodies of water in the trough is an isolating electrode in the plane of one of the measuring electrodes and surrounding the electrode and carrying a potential of substantially the same magnitude and phase as the adjacent surrounded measuring electrode and thereby confining the potential flux lines between the measuring electrodes within predetermined boundaries transverse to the electrodes. These boundaries electrically isolate the water therein and extend from one electrode to the other. The measuring electrodes themselves constitute opposite boundaries parallel to the intermediate sheet. The sheet itself constitutes an insulating member dividing the electrically isolated portion of water into two bodies which are electrically isolated despite their remaining in liquid communication. These electrically isolated bodies then constitute electrical conductors applied in intimate contact to the surface of the insulating sheet.

According to the invention, when characteristics such as the thickness or dielectric constant of the sheet change, the measured capacitance also changes. It is then possible to halt production of the sheet or rapidly to adjust the necessary conditions so that the unit capacitance of the sheet will return to the desired value.

Figure 2:
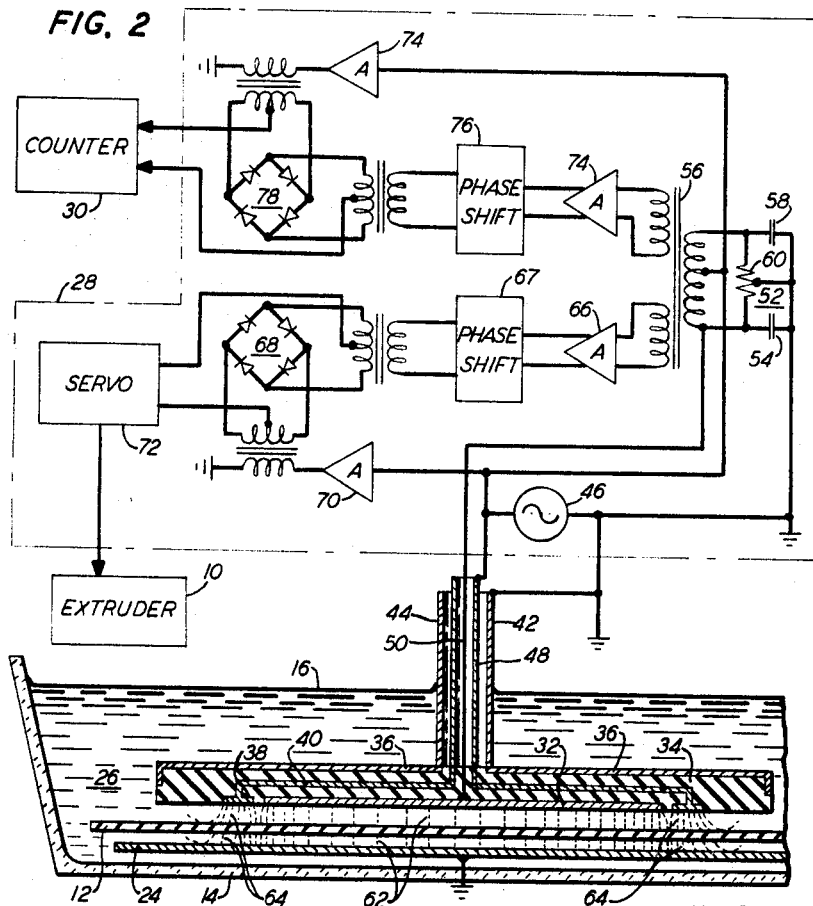

These and other features of the invention, both broader and more specific, are pointed out particularly in the claims forming a part of this specification. Other objects and advantages of the invention will become obvious from the following detailed description when read in light of the accompanying drawing, wherein:

FIG. 1 illustrates schematically and by means of a block diagram an extruding arrangement for manufacturing a continuous roll of insulating sheet and embodying features of the invention; and FIG. 2 is a partly cross-sectional view of a portion in FIG. 1 and includes a more detailed circuit diagram for measuring the characteristics of the sheet and controlling the extruder in FIG. 1.

In FIG. 1 an extruder 10 discharges at its output a continuous flow of a hot ribbon of material 12, such as polyethylene, into a cooling trough 14 filled with an electroconductive liquid such as tap water 16. The trough 14 interiorly supports two pairs of elongated horizontal idler rolls 18 and 20 at respective trough ends for guiding the issued material 12 below the surface of the water and above the base of the trough. A suitably rotated pickup roller 22 draws the sheet material 12 upwardly and rolls it into a coil.

Spaced below the sheet material 12 between the roll pairs 18 and 20 and parallel to the material is a grounded electrode 24. A disc-shaped electrical monitor 26 also parallel to the material 12 but above it and opposite the electrode 24 cooperates with the latter to measure continuously the above-defined unit capacitance of the material as a measure of its characteristics. The unit capacitance is obtained over a small area because of the small diameter of the member 26 compared to the width of the material 12.

Energizing the monitor 26 is a control circuit 28 which compares the monitor measurement to a predetermined capacitance value. The control circuit 28 then regulates the extruder 10 on the basis of departures from this predetermined value. It can do this in two ways. It can establish a tolerance limit. If the departure is within the given tolerance limit, the extruder is permitted to continue operation. If the departure exceeds the tolerance limit an alarm sounds and the extruder operation is shut down and corrected manually until the discharged material 12 returns to the range of permissible departure of the measured unit capacitance. The control circuit 28 can also regulate the extruder 10 as shown in FIG. 2, with a servo feedback which continuously changes the output of the extruder and hence the characteristics of the material 12.

The control circuit 28 also supplies to a counter 30 information concerning sudden drops in resistance of insulating material due to pinholes which conductively connect the water above the material 12 and below it, and due to conductive foreign matter or other discontinuities.

Thus, with the system of FIG. 1, information concerning the unit capacitance of the material produced is fed back to the extruder so that it may be shut off or corrected to conform its output to a predetermined product.

As stated above, the capacitance measurement embraces both the dielectric constant of the material and its thickness. A constant measurement is considered an acceptable indication of both constant dielectric constant and uniform thickness. It is assumed that simultaneous change of dielectric constant and thickness in the same ratio, that would manifest itself in constant capacitance measurements over significant periods, is unlikely.

FIG. 2 illustrates in part the arrangement of electrodes comprising the monitor 26 that cooperates with the electrode 24 for the purpose of measuring the unit capacitance. Specifically, part of FIG. 2 constitutes a section II—II of FIG. 1, showing the trough 14, the monitor 26, and the grounded electrode 24. FIG. 2 further illustrates details of the system constituted by the control circuit 28, the extruder 10, and the counter 30.

The monitor 26 and electrode 24 are spaced above and below the insulating sheet material 12, as shown by the cross-sectional portion of FIG. 2. The monitor 26 is composed of a flat circular measuring eelctrode 32 about 12 inches in diameter which is imbedded in the lower face of a cylindrical molding 34 of plastic insulating material. Imbedded in the top and partly down the vertical sides of the molding 34 is a conductive shielding electrode 36. An annular guard electrode 38 also molded into the bottom face of the molding 34 is spaced from the peripheral edge of the electrode 32 by about ½ inch. A circular and coaxial guard shield 40 electrically connected to the guard electrode 38 extends within the molding 34 parallel to the electrodes 32 and 36 beyond the edges of electrode 32 halfway across the annular guard electrode.

Connecting the shield electrode 36 to ground is the outer sheath 42 of a cable 44 that extends from the monitor 26 out of the water 16 to the control circuit 28. A 10 to 20 kilocycle oscillator 46 energizes both the guard shield 40 and the guard electrode 38 relative to the grounded sheath 42 through an inner sheath 48 in the cable 44. Between the ground connection of electrode 24 and a center conductor 50 in the cable 44, the measuring electrode 32 forms with the grounded electrode 24 a capacitive portion in the capacitance bridge generally designated 52. Parallel to this capacitive portion thus formed within the bridge is a padding condenser or capacitor 54 whose function is to help calibrate the bridge 52.

The oscillator 46 energizes the bridge 52 between a grounded line and the center tap of the primary winding on a hybrid transformer 56. Joining the respective ends of this primary winding to the ground connection from the sheath 42 is a variable standard capacitor 58 and the padding condenser 54 in parallel with the capacitive portion formed by the electrodes 24 and 32. A potentiometer 60 between the ends of the primary winding on transformer 56 has its armature connected to ground and balances the conductance of the dielectric material 12.

The oscillator 46 passes a current through the two halves of the primary winding on transformer 56 in opposing directions. In one branch alternating current passes through the capacitor 58 and in the other branch through the condenser 54 as well as the capacitive portion formed by the electrodes 24 and 32. If the capacitances are the same in both branches, the opposing currents through the primary winding will cancel each other and produce no output at the secondaries in the transformer 56. An unbalance will produce currents whose phase and magnitude reveal the degree and direction of departure of the capacitance of the portion formed by electrodes 24 and 32 from the desired capacitance.

The voltage across the branch constituted by the electrodes 32 and 24 and capacitor 54 substantially corresponds to the voltage applied to the guard electrode 38. For this purpose the halves of the primaries in transformer 56 exhibit very low impedances, substantially equal to each other, so as to avoid the respective shorting and unbalancing effects of the water, between electrodes 32 and 38, whose impedance appears across one primary winding half. These conditions are obtained by constructing the transformer 56 the same as the transformer in Patent No. 2,804,592, and adding another secondary winding. Thus, the primary winding halves are each made of very low impedance conductors and are very closely coupled. An impedance across one winding half is then reflected across the other. Specifically, each winding half comprises four turns of two parallel 19-gauge wires, bifilary interwoven with the four turns of two parallel 19-gauge wires on the other winding half. The windings are closely spaced on a common toroidal core made of high permeability such as "Permalloy" tape. As a result of the high degree of coupling between the low impedance winding halves, the impedance of the water shunting either side of the primary winding will have negligible effect on the voltage induced in the secondary windings, each of which serves as a detector arm of bridge 52.

In view of the negligible impedances of the primary winding halves on transformer 56, the voltages at the electrodes 32 and 38 are substantially equal relative to the grounded electrode 24. Thus, the potential flux lines produced in the water and passing through the dielectric sheet 12 correspond to those shown in the sectional portion. The reference numeral 62 designates the potential flux lines from the electrode 32, and the reference numeral 64 designates the flux lines from the guard electrode 38. Because the flux lines are produced by voltages of substantially equal value, the flux lines 64 will tend to constrict the flux lines 62 within a volume bounded vertically by a cylindrical surface electrically separating the guard electrode 38 from the measuring electrode 32.

The conductive character of the water 16 electrically extends the electrode 32 downwardly within this vertical barrier until it contacts the sheet 12. The flux lines 62 extend the electrode 24 upwardly within this vertical bound until it contacts the lower face of the sheet 12. Thus, the conductive bodies of water outlined vertically by the border between the flux lines 62 and 64 and the upper and lower sides by the electrodes 32 and 24 and separated from each other electrically by the sheet 12 constitute the actual electrodes in contact with the dielectric sheet 12. These electrodes are electrically isolated despite their communicating with each other, that is despite their being physically connected through the liquid.

The spacing, over a practical range, between the electrodes and the plastic material 12 has little effect on the measurements. The actual capacitance within the trough 14 thereby participating in the operation of the bridge 52 is only that portion within these strictly defined bounds and constituted by these strictly defined bodies of water. Therefore, a specific unit area capacitance, the unit capacitance, is being measured at any one time as the material 12 passes through the trough 14.

The values of capacitors 58 and 54 and potentiometer 60 are set so that when the thickness, dielectric constant, and other characteristics of the material 12 correspond to a predetermined value, the capacitance in one arm of the bridge 52 balances the capacitance 58. Then the opposing currents flowing in each half of the primary in transformer 56 balance each other. Thus, no current flows in the secondary windings of the transformer 56. If any one of the characteristics of the measured sheet portion depart from this predetermined value, the current in one half of the primary exceeds the opposing current in the other half. Current then flows in both of the secondary windings.

The capacitors 58 and 54 in the bridge shift the phase of currents in each branch of the bridge substantially 90 degrees from the oscillator 46 voltage. The secondary or error voltages in transformer 56 are thus shifted approximately 90 degrees from the oscillator voltage. Whether they lead or lag the oscillator voltage indicates which branch of the bridge 52 conducted the larger of the two opposing currents, and hence whether the measured departure is positive or negative. Thus, the phase and magnitude of the error currents represent the direction and degree of departure of the measured capacitance from the predetermined values.

The error output of the first secondary winding passes through an amplifier 66 to a phase shifter 67 which shifts the phase of the error voltage 90 degrees. The error voltage is then in phase consonance or phase opposition to the oscillator 46 depending on the direction of the measured departure. The phase shifter 67 is slightly variable to obtain precise phase consonance or opposition.

The input winding of a ring modulator generally designated 68 and operating as a phase detector receives the phase shifted signal. A reference input to the ring modulator comes from the oscillator 46 through an amplifier 70. The ring modulator 68 compares the phase of the error output in the secondary of transformer 56 with the phase of the oscillator 46. At the same time it rectifies and compares the magnitudes of the input signals. It produces a direct voltage output whose magnitude and polarity correspond to the magnitude and direction of departure of the capacitance formed by the sheet 12 and its electrodes from the predetermined value. This direct current value thus constitutes a measure of the magnitude and direction of departure of the ratio $e/t$ of the material 12 from the predetermined value. If $e$ is constant, then the departure constitutes a measure of the magnitude and direction of the error in the thickness $t$.

A servo system 72 transmits this information and controls the extruder 10 so as to correct for the departure in the measured capacitance from the value.

The error signal at the other secondary of transformer 56 passes through an amplifier 74 to an adjustable correcting phase shifting network 76 that shifts the phase of the signal a few degrees so as to be precisely 90 degrees displaced from the voltage of oscillator 46. Whereas the error output into the amplifier 66, when shifted 90 degrees and compared to the oscillator voltage, corresponds to the departure of capacitance in one branch from that of the capacitance 58 in the capacitance bridge 52, the error itself with no or little phase shift constitutes a measure of the conductive component of the measured error. This value at the output of correcting phase shifter 76 is fed to a second ring modulator 78, also responding to the oscillator 46 through amplifier 70. The direct voltage output of ring modulator 78 corresponds in magnitude to the conductance departure from the desired reference conductance of the sheet material 12. Such departure exists, for example, when pinholes pass through the dielectric material 12. In some instances these pinholes are completely objectionable. In other instances, however, these pinholes are permitted if restricted within a predetermined number. The counter 30 counts the number of pinholes and determines whether each particular length of sheet material 12 possesses only the permissible number of pinholes. The phase shifter 76 merely permits adjusting the error to produce a zero reading when no pinholes appear. Shifter 67 is similarly adjustable.

Both conductive and capacitive measurements are possible with the capacitance bridge 52 because it is basically an impedance bridge which compares the impedances in one branch with the impedance in the other branch. Thus, shifting the error 90 degrees permits observance of the capacitive component of the impedances measured.

The phase detecting ring modulators 68 and 78 can be substituted by other phase detectors, such as those described in the book Electronic Instruments, by Greenwood, Holdan and MacRae, volume 21 of the Radiation Laboratory Series, published by the McGraw-Hill Book Company of New York, Toronto and London, in 1948.

In operation, the extruder 10 discharges a flat band of sheet material that passes between a monitor 26 and electrode 24 to a roller 22. Electrodes 32 and 24, together with the conductive water, form two capacitor plates that contact a portion of the material 12 on opposite sides. The size of these plates is restricted by means of the guard electrode 38 to which a potential is applied corresponding to the potential at the electrode 32. The flux lines of the guard electrode 38 constrict the flux lines of the electrode 32 which receives current from the oscillator 46 as one branch of a capacitor bridge 52. The other branch constitutes a standard capacitor 58. In the event that the capacitance measured by the bridge in the water electrode plates departs from the value determined by the capacitor 58, an error signal, phase shifted 90 degrees to observe the reactive components of the measured impedances, passes to a ring modulator 68 that controls a servo 72 which corrects the output of the extruder 10 so as to change the thickness of the material 12. The amplifier 74 derives the resistive component of the impedances measured in the capacitance bridge and applies these to a second ring modulator 78 which counts the departures of impedances. The latter generally constitute pinholes or conductive foreign matter in the sheet material.

It is contemplated that the servo 72 be substituted by a potentiometer network comparing a standard voltage to the output of ring modulator 68. If the latter output exceeds the standard voltage the extruder 10 is shut off or an alarm may be sounded.

It is contemplated that several simultaneous measurements of smaller unit area be made with several monitors 26. Furthermore, the invention contemplates scanning the width of the material 12 with one moving monitor.

While embodiments of the invention have been disclosed in detail, it will be obvious to those skilled in the art that the invention may be embodied otherwise as suggested above within the scope of the invention.

What is claimed is:

1. The method of measuring the characteristics of sheet insulation, which comprises submerging sheet insulation having opposite faces in an electroconductive liquid, electrically isolating a column of said liquid while it remains in communication with the remainder of said liquid by applying along a columnar portion of the liquid an alternating electric field and applying through a second portion surrounding the first portion a second electrically separate but substantially identical field, whereby the first portion forms the isolated column bisecting the column with said sheet so as to isolate from each other two communicating bodies of said liquid column, and measuring the capacitance between said bodies.

2. The method of monitoring continuously the unit area characteristics of an insulating sheet, which comprises continuously advancing a sheet through an electroconductive liquid, electrically isolating a column of said liquid while it remains in communication with the remainder of said liquid, bisecting the column with said sheet so as to isolate from each other two communicating bodies of said liquid column, said bodies each contacting successive increments of opposite faces of the submerged portion of the sheet, and comparing the capacitance between the bodies to a standard capacitance; said step of electrically isolating including applying between the ends of a columnar portion of the liquid an alternating electrical potential and applying between the ends of a second portion surrounding the first portion a second electrically separate but substantially identical parallel potential, whereby said first portion forms said column.

3. The method of monitoring the characteristics of an insulating sheet, which comprises submerging the sheet in an electroconductive liquid, electrically isolating two bodies of said liquid each contacting opposite faces of said submerged sheet while maintaining liquid communication between them, and measuring the capacitive and conductive components of the impedance between the bodies; said step of electrically isolating including establishing through the bodies and the sheet a first electric field and applying around the bodies and through the sheet a second substantially identical electric field separate from the first, whereby the second field isolates the first field from the remainder of the liquid.

4. The method of monitoring the characteristics of an insulating sheet, which comprises submerging the sheet in an electroconductive liquid, electrically isolating a column of said liquid while it remains in communication with the remainder of said liquid and confining the columnar cross section to dimensions fitting within the area of the sheet, bisecting the column with said sheet so as to isolate from each other two communicating bodies of said liquid column, applying an alternating electrical potential between the isolated bodies, and measuring the capacitive component of the impedance between the bodies, and deriving from the measurement the conductive component of the impedance between the bodies; said step of electrically isolating including longitudinally applying through a columnar portion of the liquid an alternating electrical field and applying through a second portion surrounding the first portion a second electrically separate but substantially identical field, whereby said first portion forms said column.

5. Apparatus for measuring characteristics of an insulating sheet having opposite faces, comprising liquid container means having therein an electroconductive liquid surrounding at least a portion of said sheet, electrical means for establishing in the liquid two equal electric fields both passing through the sheet with one field surrounding the other so as to confine the other, and circuit means including a portion of said electrical means for measuring an impedance component of the impedance encountered by currents along the inner one of the fields.

6. Apparatus for measuring characteristics of an insulating sheet having opposite faces, comprising liquid container means having therein an electroconductive liquid surrounding at least a portion of said sheet, electrical means for electrically isolating two bodies of the liquid each contacting one face of the sheet while retaining liquid communication between the bodies, said electrical means isolating said bodies by establishing through said bodies and the sheet a first electrical field and around said body and through said sheet a second equal and substantially parallel electrical field, and circuit means including a portion of said electrical means for measuring capacitive and conductive components between said bodies.

7. Apparatus for measuring characteristics of an insulating sheet having opposite faces, comprising liquid container means having therein an electroconductive liquid surrounding at least a portion of said sheet, electrical means for electrically isolating a column of liquid from the remainder of the liquid while retaining communication with the remaining liquid, said column being bisected by said sheet so as to form two electrically isolated communicating bodies of the liquid each contacting one face of the sheet, electrical means isolating said column by establishing through said column a first electric field and around said column a second equal electric field, and circuit means including a portion of said electrical means for measuring the capacitance between said bodies.

8. Apparatus for measuring characteristics of an insulating sheet having opposite faces, comprising liquid container means having therein an electroconductive liquid surrounding at least a portion of said sheet, first and second electrode means immersed in said liquid each facing one face of said sheet, guard electrode means surrounding said first electrode means, control means for applying between said first and second electrode means an alternating voltage, said control means applying between said guard and second electrode means a voltage substantially the same as said alternating voltage for confining flux lines extending between said first and second electrode means into a predetermined liquid volume having two electrically isolated bodies separated by said sheet, said control means having circuit means for measuring an impedance component between said first and second electrode means.

9. Apparatus for measuring characteristics of an insulating sheet having opposite faces, comprising liquid container means having therein an electroconductive liquid surrounding at least a portion of said sheet, first and second electrode means immersed in said liquid each facing one face of said sheet, guard electrode means surrounding said first electrode means, control means for applying between said first and second electrode means an alternating voltage, said control means applying between said guard and second electrode means a voltage substantially the same as said alternating voltage for confining flux lines extending between said first and second electrode means into a predetermined liquid volume having two electrically isolated bodies separated by said sheet, said control means having circuit means for measuring the capacitive and conductive components of the impedance between said first and second electrode means.

10. Apparatus for measuring characteristics of an insulating sheet having opposite faces, comprising liquid container means having therein an electroconductive liquid surrounding at least a portion of the sheet, first and second electrode means immersed in said liquid and facing respective faces of said sheet, guard electrode means surrounding said first electrode means, control means for applying between said first and second electrode means an alternating voltage, said control means applying between said guard and second electrode means a voltage substantially the same as said alternating voltage for confining flux lines extending between said first and second electrode means into a predetermined liquid volume having two communicating but electrically isolated bodies separated by said sheet, a grounded stabilizing electrode outside of said two bodies, a conductive protecting shield between said stabilizing electrode and said first electrode means and connected to said guard electrode means, said control means having circuit means for measuring the capacitive component of the impedance between said first and second electrodes, said control means having means to derive from said circuit means the conductive component of the impedance between said first and second electrode means, said circuit means including a phase shifting circuit.

11. Apparatus for manufacturing a continuous sheet of insulating material comprising, sheet producing means for issuing a continuous insulating sheet having opposite faces, cooling means holding a conductive liquid for surrounding continuous portions of the sheet as it is produced, take-up means for drawing the sheet out of the cooling liquid, electrical means for establishing in the liquid two equal electric fields both passing through the sheet with one field surrounding the other so as to confine the other, measuring means including a portion of said electrical means for measuring an impedance component of the impedance encountered by current passing through the inner one of the fields, and control means for varying the producing means in dependence upon the measured impedance component.

12. Apparatus for manufacturing a continuous sheet of insulating material comprising, sheet producing means for issuing a continuous insulating sheet having opposite faces, cooling means holding a conductive liquid for surrounding continuous portions of the sheet as it is produced, take-up means for drawing the sheet out of the cooling liquid, electrical means for electrically isolating a column of liquid from the remainder of the liquid while retaining communication with the remaining liquid, said column being bisected by said sheet so as to form two electrically isolated communicating bodies of the liquid each contacting one face of the sheet while retaining liquid communication between them, source means for applying an alternating potential between said bodies, and circuit means for measuring the capacitance between said bodies, and control means for varying the producing means so as to change the thickness of the sheet issued in dependence upon the measured impedance component, said electrical means including said source means and isolating said column by establishing through said column a first electric field and around said column a second equal parallel electric field, said circuit means including a portion of said electrical means.

13. Apparatus for manufacturing a continuous sheet of insulating material comprising, sheet producing means for issuing a continuous insulating sheet having opposite faces, cooling means holding a conductive liquid for surrounding continuous portions of the sheet as it is produced, take-up means for drawing the sheet out of the cooling liquid, electrical means for electrically isolating a column of liquid from the remainder of the liquid while retaining communication with the remaining liquid, said column being bisected by said sheet so as to form two electrically isolated communicating bodies of the liquid each contacting one face of the sheet while retaining liquid communication with each other, said sheet having an area sufficiently great to embrace a cross section of said column, source means for applying an alternating potential between said bodies, circuit means for measuring the capitance component of the impedance between said bodies, means connected to the circuit means for deriving therefrom the conductance component of the impedance, control means for varying the sheet producing means so as to change the thickness of the sheet issued in dependence upon the measured impedance component, and counter means for determining the number of sudden changes in conductance of the insulating sheet, said electrical means including said source means and isolating said column by establishing through said column a first electric field and around said column a second equal parallel electric field, said circuit means including a portion of said electrical means.

14. Apparatus for manufacturing a continuous sheet of insulating material comprising, sheet producing means for issuing a continuous insulating sheet having opposite faces, cooling means holding a conductive liquid for surrounding continuous portions of the sheet as it is produced, take-up means for drawing the sheet out of the cooling liquid, first and second electrode means immersed in said liquid each facing one face of said sheet, guard electrode means surrounding said first electrode means, control means for applying between said first and second electrode means an alternating voltage, said control means applying between said guard and second electrode means a voltage substantially the same as said alternating voltage for confining flux lines extending between said first and second electrode means into a predetermined liquid volume having two electrically isolated bodies separated by said sheet, said control means having circuit means for measuring the capacitance between said first and second electrode means, and feedback means for varying the producing means in dependence upon the measured impedance component.

15. Apparatus for manufacturing a continuous sheet of insulating material comprising, sheet producing means for issuing a continuous insulating sheet having opposite faces, cooling means holding a conductive liquid for surrounding continuous portions of the sheet as it is produced, take-up means for drawing the sheet out of the cooling liquid, first and second electrode means immersed in said liquid each facing one face of said sheet, guard electrode means surrounding said first electrode means, control means for applying between said first and second electrode means an alternating voltage, said control means applying between said guard and second electrode means a voltage substantially the same as said alternating voltage for confining flux lines extending between said first and second electrode means into a predetermined liquid volume having two electrically isolated bodies separated by said sheet, said control means having circuit means for measuring the capacitive component of the impedance between said first and second electrode means, said control means having means to derive from said circuit means the conductive component of the impedance between said first and second electrode means, feedback means for varying the producing means so as to change the thickness of the sheet issued in dependence upon the measured impedance component, and counter means for determining the number of sudden changes in conductance of the insulating sheet.

(References on following page)

References Cited

UNITED STATES PATENTS

| | | |
|---|---|---|
| 2,203,839 | 6/1940 | Ogilvie. |
| 2,238,610 | 4/1941 | Thomas _____ 324—61 |
| 2,289,933 | 7/1942 | Rankin _____ 18—2 |
| 2,524,936 | 10/1950 | Smith. |
| 2,535,026 | 12/1950 | Anderson _____ 324—61 |
| 2,562,575 | 7/1951 | Raesler _____ 324—61 |
| 2,765,441 | 10/1956 | Gambrill _____ 18—2 X |
| 2,804,592 | 8/1957 | Biskeborn. |
| 2,820,987 | 1/1958 | Bunch _____ 18—2 X |
| 3,015,129 | 1/1962 | Hayes et al. _____ 18—2 X |
| 3,039,051 | 6/1962 | Locher _____ 324—61 |
| 3,221,248 | 11/1965 | Batteau et al. _____ 324—61 X |

RUDOLPH V. ROLINEC, *Primary Examiner.*

E. E. KUBASIEWICZ, *Assistant Examiner.*